Sept. 11, 1934.   J. C. PATERSON ET AL   1,973,225
MACHINE FOR DEPOSITING SEMIFLUID MATERIAL IN MOLDS
Filed March 21, 1932   3 Sheets-Sheet 1

INVENTORS
JOHN CURRIE PATERSON
GEORGE RALPH BAKER
BY George B. Willcox
ATTORNEY

Sept. 11, 1934.  J. C. PATERSON ET AL  1,973,225
MACHINE FOR DEPOSITING SEMIFLUID MATERIAL IN MOLDS
Filed March 21, 1932  3 Sheets-Sheet 2

INVENTORS
JOHN CURRIE PATERSON
GEORGE RALPH BAKER
BY George B. Willcop
ATTORNEY

Sept. 11, 1934.  J. C. PATERSON ET AL  1,973,225
MACHINE FOR DEPOSITING SEMIFLUID MATERIAL IN MOLDS
Filed March 21, 1932  3 Sheets-Sheet 3

INVENTORS
JOHN CURRIE PATERSON
GEORGE RALPH BAKER
BY George B. Willcox
ATTORNEY

Patented Sept. 11, 1934

1,973,225

UNITED STATES PATENT OFFICE

1,973,225

MACHINE FOR DEPOSITING SEMIFLUID MATERIAL IN MOLDS

John Currie Paterson and George Ralph Baker, London, England, assignors to Baker Perkins Company, Inc., Saginaw, Mich., a corporation of New York Application March 21, 1932, Serial No. 600,236 In Great Britain March 28, 1931

10 Claims. (Cl. 107—27)

This invention relates to machines for depositing molten confectory material, such as chocolate, in spaced molds or other receiving surface carried by a conveyor past the depositing machine, and has for its object the provision of an improved oscillatory nozzle adapted to move with or relative to the moving mold during its depositing operation, at the end of which the flow of chocolate is shut off and the nozzle returns quickly to its original position to repeat the operation.

A further object of the invention is to provide an improved shut-off valve at the outlet of a depositing nozzle for automatically and instantaneously closing the outlet at the end of each depositing operation.

While the invention may be used in conjunction with various types of depositing machines, we show it applied to a machine having a rotary gear pump for supplying an intermittent flow of melted chocolate.

In machines of this type heretofore used the depositing nozzle has been fixed in relation to the pumping or supply device, and the motion of the nozzle to follow up the molds was provided by oscillating the supply hopper or pumping device bodily lengthwise the path of travel of the molds on the conveyor. This type of machine was necessarily complicated in design because of the driving mechanism for the pump, and it required a large amount of power to reciprocate the nozzle, since the heavy mass of the chocolate hopper and the pumping mechanism had to be moved bodily with the nozzle.

Our improved machine eliminates these disadvantages by the provision of a stationary hopper and pump mechanism together with a discharge nozzle communicating with the outlet from the supply pump, but displaceable relative thereto, it being mounted for oscillation about a horizontal axis extending lengthwise of said outlet, together with actuating means for imparting oscillatory motion to it in timed relation with the travel of the molds on the conveyor, so as to correlate its position and travel to that of a mold to spread or centre the deposits therein.

A further feature of the invention consists in a novel shut-off valve at the extreme end of the nozzle which is closed automatically at the end of the depositing motion of the oscillatory nozzle to prevent dripping of the chocolate remaining in the nozzle.

A preferred embodiment of our invention is shown in the accompanying drawings, of which Fig. 1 is a side elevation, partly broken away, of a depositing machine embodying both its features.

Figure 1:
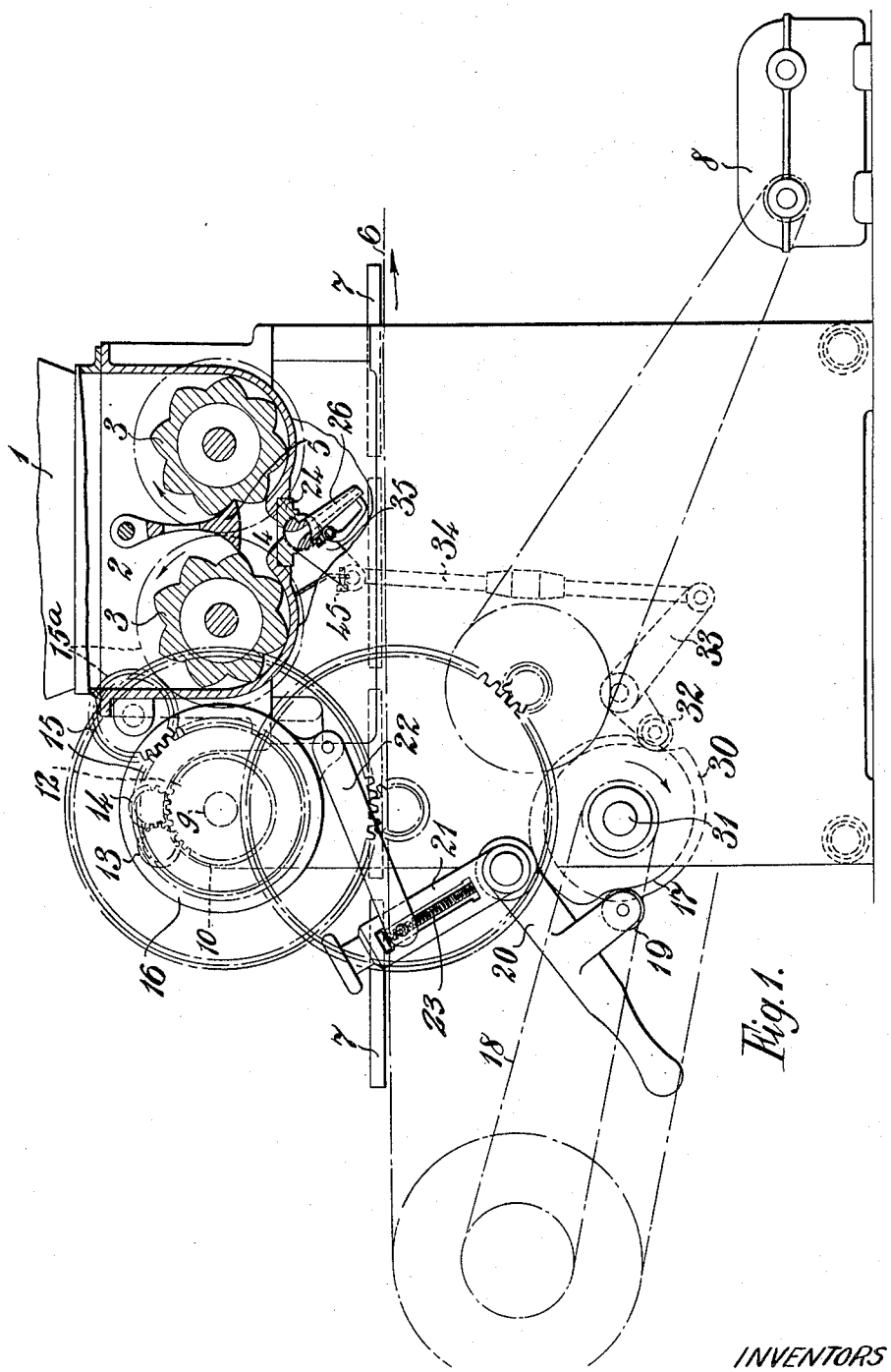

We have shown the invention applied to a feeding pump of known type comprising a hopper 1 for supplying chocolate to a pump chamber 2 in which a pair of fluted rolls or gears 3 are mounted, closely conforming to the semi-cylindrical bottom sections of the pump chamber and driven oppositely to each other, as indicated by the arrows, to impel the chocolate or other molten material toward the outlet 4 between them in the bottom of the pump chamber. An oscillatory abutment member 5 is positioned between and co-operates with the two rolls 3 and closes off the outlet 4 of the chamber from the upper part thereof.

A conveyor 6 passes beneath the outlet of the feed pump and carries molds 7, in which the chocolate is to be deposited. The drive for the rotary elements comprises a variable speed gear 8 coupled to the shaft 9 of a differential epicyclic gear of known form. The shaft 9 of the differential epicyclic gear has a sun pinion 10 secured thereto and the driven element of the gear is in the form of a sleeve shaft 11 surrounding the driving shaft. The sleeve 11 carries a second sun pinion 12, and two planet pinions 13, 14 are mounted in the cage 16 of the gear so that they mesh with one another and with the two sun pinions 10, 12 respectively. The motion of the sleeve 11 is communicated to the pump elements 2, 3 through a gear train 15, 15a.

The cage 16 is provided with means adapted to cause it to oscillate about its axis so that in one direction of movement the speed of the sleeve shaft 11 is increased while in the other direction there is a subtraction effect such that the sleeve and the pump are brought to rest or slowed down in the required manner.

The oscillations of the differential cage 16 are synchronized with the travel of the spaced mold pans. For this purpose a rotary cam 17 is provided which is driven from the conveyor drive by the chain 18. The cam 17 engages a roller 19 on one arm 20 of a pivoted bell crank lever, the other arm 21 of which is connected to the cage 16 by a link 22.

The connection of the link 22 to the arm 21 of the bell crank lever is made adjustable by screw means 23 so that the point of connection may be adjusted relatively to the axis of the bell crank lever. By this adjustment the amplitude of the oscillations of the cage 16 may be varied according to the amount of material being deposited.

The cam 17 is preferably designed to give a forward and return motion to the cage 16 for each complete cycle of operations, and both these motions are generally uniform. The motions may each occupy half of the whole cycle of the cam, or else, as in the more usual application, the retrograde motion which brings the rotary elements to rest and thus stops the feed of material through the nozzle, is short, to correspond with the space between the pans 7. The forward motion then consists of a slow uniform travel which speeds up the pump elements over and above the normal speed imparted to them by the driving gear.

In certain cases the motion of the cage 16 may be non-uniform in either or both of its directions. For example, it may be desired to start or finish a deposit slowly, in this case the retrograde motion set up by the cam 17 is made slower at the start or finish than for the remainder of this motion.

Again, a more rapid deposit may be required to start with, in which case the forward motion of the cage is appropriately modified by varying the contour of the cam 17.

Figure 3:
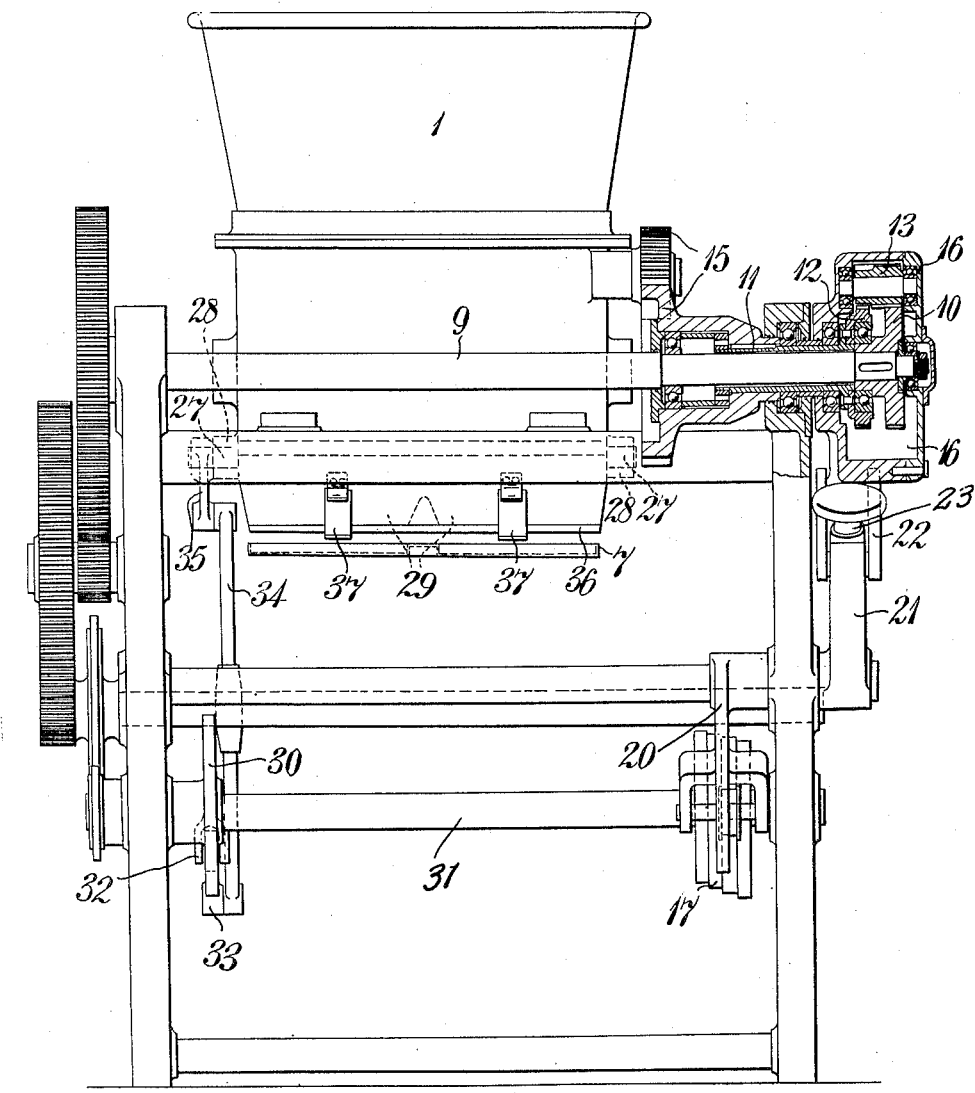
Fig. 3 is an end elevation of the machine viewed from the left in Fig. 1, part being shown in section.

Thus with a larger or smaller deposit the movement of the cage 16 during its retrograde or slowing-up movement may correspondingly be made longer or shorter. It will be appreciated that the average quantity of material to be deposited will be adjustable by an adjustment of the variable speed gear 8. The timing of the differential gear cage 16, however, always agrees with the travel of the molds 7, and this timing can only be varied by altering the cam 17. For this purpose the cam may, if desired, be of an adjustable type, or it may be readily removable for replacement by a different cam. Also a series of cams may be provided, as indicated in Fig. 3, the arm 20 being laterally adjustable to engage the selected cam.

The outlet of the pump is provided with an apertured plate 24, the aperture extending transversely of the conveyor. Plate 24 has on its under side an arcuate or partially cylindrical seat 25, the axis of which is horizontal. In this seat 25 is fitted the correspondingly arcuate upper end of the depositing nozzle 26, which extends across the conveyor 6 over the full width of the mold or molds to be filled. The nozzle is rotatably secured in place by pivots 27 at its transverse extremities (see Fig. 3). Pivots 27 are journalled in suitable bearings 28 in the pump casing. Alternatively, the seat in plate 24 may extend through more than half a circle so that it acts as a bearing support for the semi-cylindrical upper end of the nozzle.

The nozzle 26 is provided with a series of separated feed passages 29 to correspond in width and number to the width and the number of longitudinal rows of molds in which the chocolate is to be deposited.

The nozzle 26 may be given its oscillatory motion by any suitable means synchronized with the passage of the molds on the conveyor. In our preferred form we show a cam 30 on cam shaft 31 driven from the conveyor drive, which through a cam-following roller 32 oscillates a bell-crank lever 33. An adjustable link 34 connects lever 33 to an arm 35 fixed to a pivot 27 of the nozzle. The contour of cam 30 is such that the nozzle outlet will move slowly to the left in Fig. 1, counter to the travel on the conveyor of the mold 7 into which chocolate is being deposited, and then return quickly to the right and repeat its motion during the filling of the next following mold.

Figure 2:
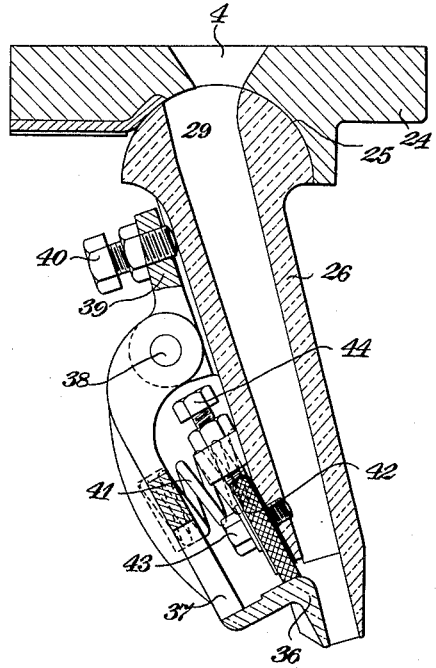
Fig. 2 is a transverse cross section of the oscillatory nozzle, showing the details of the shut-off valve at the outlet thereof.

The nozzle 26 at its outer end is provided with a valve device which preferably comprises a sliding shutter or plate adapted to move inwardly across the depositing passage 29. A single plate may be employed for the full width of the nozzle, or a plurality of plates may be employed, one for each feed passage 29. A slidable flat shut-off plate member may be used, to fit closely across the edges of the side walls of the nozzle, or as shown in Fig. 2, the shut-off member may form one lip or side wall 36 of the nozzle and be mounted for movement inwardly to close against the opposite lip. For the purposes of this application one of the pair of valve devices employed on the nozzle will be described.

Referring to Fig. 2, the valve lip 36 is a member angular in cross section fixed at the lower extremity of a valve lever 37, which is mounted on a horizontal shaft 38 carried by the nozzle. The valve lever 37 is provided with an arm 39 extending to the opposite side of the shaft 38 and provided with an adjustable abutment screw 40 to engage the side wall of the nozzle and limit the extent to which the valve can be opened. A coil spring 41 between lever 37 and the wall of the nozzle maintains the valve normally open.

The upper side of the valve lip is sealed by a packing strip 42 adjustably secured to the lower portion of the wall of the nozzle for adjustment to take up wear. The packing strip 42 extends transversely of the nozzle, is slotted longitudinally of the nozzle, and is secured in position by set screws 43 which pass through the slots. To adjust the position of the packing strip 42 with respect to the movable valve lip 36, a series of set screws 44 is arranged along the nozzle to push the strip downward against the upper surface of the valve lip.

In operation, the valve is closed at the end of each depositing swing of the nozzle by engagement of the lever 37 with a stationary abutment 45 fixed to the bottom of the pump chamber 2 shown in Fig. 1. The abutment is in the form of a screw to permit of varying the time of closing of the valve.

It is to be understood that the arrival of the nozzle at the end of the depositing swing coincides with a non-depositing period of the pump and that the closing of the valve 36 is for the purpose of preventing dripping of the chocolate that remains in the nozzle.

When depositing certain viscous substances, the valve 36 may be dispensed with.

Figure 4:
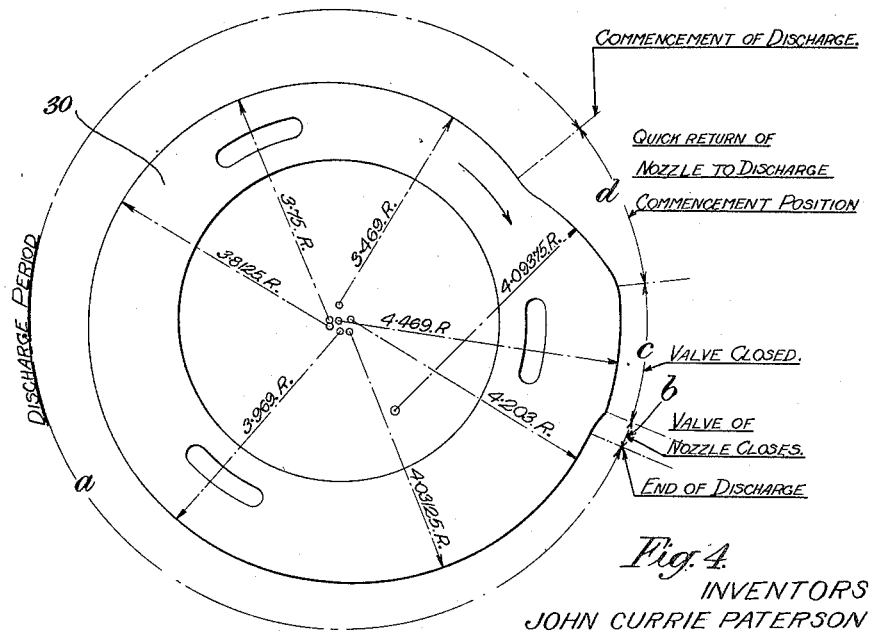
Fig. 4 is a diagram of the cam used for oscillating the nozzle.

In Figure 4 an enlarged view of the cam 30 is shown, the numerals, as 3.75 R, designating radii of greater or less length, from which it will be noted that while the part $a$ is passing beneath the roller 32 the nozzle will be swung from the right to the left in Fig. 1 while depositing takes place; when the highest part of $a$ is beneath the roller the deposit ceases, the nozzle then being at the end of its depositing swing. In order to close the valve 36 a further slight rise of the cam is provided at $b$ which gives a slight swing of the nozzle to the left in Fig. 1 to bring the lever 37 into contact with the screw abutment 45. The valve is maintained closed by the passage of the circular portion $c$ beneath the roller 32 at the end of which the nozzle is swung to the right in Fig. 1 and the valve opened by the part *d* of the cam moving beneath the roller 32.

In operation it will be appreciated that the return swing of the nozzle 26 occurs during a non-depositing period of the feeding pump, and for this purpose the cams 17 and 30, which are both mounted on the shaft 31, will be set accordingly. Thus in Figure 1 the roller 19 has just descended the decreasing part of the cam 17 producing the retrograde movement of the cage 16 with the consequent non-feeding action of the pump. At the same time the roller 32 has descended the portion *d* of the cam 30 to swing the nozzle from the left to the right.

With the arrangement illustrated, as a mold 7 travels to the right (as seen in Figure 1) the nozzle 26 swings to the left depositing chocolate in the mold and during this period the cage of the differential is oscillated to cause a uniformly increasing speed of the pump elements 3.

At the end of the depositing period when the nozzle 26 has swung to the left in Figure 1 the cage 16 of the differential starts a reverse oscillation to prevent further feeding by the pump elements 3. Continued movement of the cam 30 closes the valve 36 and prevents dripping of the chocolate remaining in the nozzle.

Further rotation of the cam shaft 31 brings the roller 19 down the decreasing part of the cam 17 and thus prevents feeding of the pump and at the same time the roller 32 will move down the part *d* of the cam 30 and return the nozzle to the right in Figure 1.

During the non-depositing period when the nozzle 26 is moving to the right the gap between the pair of trays 7 will pass beneath the nozzle so that when the feeding period is about to commence the next mold will be in position to receive a deposit.

While we described above one operating cycle for the nozzle, the invention is not limited to this mode of operation. Cams of varying contours may be employed to obtain different oscillatory cycles of the nozzle, depending on the length of the molds and the kind of goods being produced. For example, during a deposit the nozzle might be oscillated several times through a limited arc, and then swing to the extreme left to stop the flow of material.

Obviously, the contour of the cam 17 will be made to suit the contour of the cam 30 so that the necessary depositing and non-depositing periods of the pump in the cycle will be arranged. Thus in filling mold trays having a plurality of molds per tray, the nozzle may be oscillated for the deposit in each successive mold as it passes.

By the use of the novel oscillatory nozzle described above, we have provided a depositing machine which requires a relatively simple drive mechanism for the chocolate pumping elements and which is economical in power consumption, due to the elimination of heavy reciprocatory masses. The improved shut-off valve for the depositing nozzle, which is applicable also to other types of depositing machines and nozzles, is simple in construction, positive in operation, and insures that the flow of chocolate shall be completely and finally interrupted at the conclusion of each depositing operation, eliminating dripping between deposits.

Having thus described our invention, what we claim and desire to secure by Letters Patent is:—

1. In a machine for depositing fluid material into travelling molds, a depositing nozzle mounted for reciprocatory motion of its outlet in the direction of travel of the molds, means for reciprocating the outlet of the nozzle in timed relation to the travel of the molds, a normally open valve at the outlet of said nozzle, and a stationary abutment to engage and close said valve in the reciprocation of the nozzle.

2. Apparatus as claimed in claim 1, wherein the valve means comprises a movable gate adapted to close off the outlet end of the nozzle, a lever carrying said gate pivoted to the body of the nozzle, and spring means for normally holding the gate open, said stationary abutment engaging said lever to close the valve.

3. In a machine for depositing measured quantities of semi-liquid or plastic material into continuously traveling molds, in combination, a stationary hopper having an outlet and a feeding device, driving means associated with said feeding device adapted to impart thereto intermittent feeding movements, a downwardly depending depositing nozzle swiveled to the bottom of the hopper and communicating with said feeding device and mounted to oscillate about a horizontal axis, means for imparting intermittent oscillatory motion to said nozzle in appropriately timed relation to the spacing and rate of travel of said molds and means for varying the speed of the driving means of the feeding device so as to produce non-feeding intervals corresponding to the travels of the nozzle in one direction, and for actuating said feeding device at a uniformly increasing rate during the depositing movements of the nozzle.

4. In a machine for depositing fluid material into traveling molds, a depositing nozzle mounted for reciprocatory motion of its outlet along the path of travel of the molds, means for discharging material from said nozzle during its reciprocation in one direction only, a normally open valve at the outlet of said nozzle and a member adapted to actuate the valve to close the outlet at the end of said discharging reciprocation of the nozzle.

5. A structure as set forth in claim 4 including actuating means adapted to impart oscillatory movements to the nozzle in appropriately timed relation with the travel of the molds so as to correlate the position and travel of the nozzle with that of a traveling mold to spread or center the deposits therein.

6. A structure as set forth in claim 4 wherein the means for closing the outlet includes a lever pivotally secured to the nozzle, a lip member carried by said lever and movable therewith to open and close the nozzle outlet, an adjustable abutment member associated with the lever and adapted to limit the extent to which the valve can be opened.

7. In a machine for depositing semi-liquid or plastic materials into traveling molds, a stationary feed hopper containing a power driven feed device arranged for intermittent feeding actions, a depositing nozzle journaled on the hopper for oscillatory movement of its outlet and communicating with the feeding device, means for oscillating the outlet of the nozzle along the path of travel of the molds, and means for timing the oscillations of the nozzle relatively to the feeding of material through the nozzle, whereby during a feeding period of the feed device the nozzle is moved counter to the direction of movement of the molds and during a non-feeding period the nozzle is moved in the opposite direction at increased speed.

8. In a depositing machine having a conveyor with spaced trays thereon and a stationary hopper and a gear pump driven through a combined variable drive mechanism and a cam-controlled differential gear, whereby feeding periods of the pump are made to alternate with non-feeding periods, a tray filling and spreading device comprising, in combination, an oscillatable depositing nozzle communicating with the stationary hopper and pump, and nozzle-actuating means operable to correlate the oscillatory movements of the nozzle with the intermittent feeding periods of the gear pump and with the tray travel in such manner that during a depositing movement of the nozzle the pump operates with uniformly increasing speed, and at the end of such depositing movement of the nozzle the pump ceases its feeding action until the nozzle has returned to position for commencing the next depositing movement, and during such return movement of the nozzle the gap between successive trays on the conveyor is caused to pass beneath the nozzle.

9. A tubular nozzle having its discharge end downwardly directed and oscillatable, a shutter movable across the outer end of the nozzle passage and forming a side wall of the nozzle tip, a lever carrying said shutter and hinged to the nozzle, an arm on the lever, an adjustable abutment member associated with the arm and adapted to limit the extent of opening of the shutter, spring means adapted to keep the shutter normally open, a packing adjacent the upper edge of the shutter and adjustable relatively thereto, and an adjustable member mounted on a fixed support for closing said shutter at the extremity of oscillatory travel of the nozzle in one direction.

10. A depending nozzle mounted for back-and-forth movement of its tip, a shutter at said tip, means at the nozzle holding the shutter normally open, a co-operating abutment member mounted on a fixed support in the path of travel of the shutter at the end of a movement of the nozzle tip, and means for effecting relative adjustment of the said abutment and the shutter.

JOHN CURRIE PATERSON.
GEORGE RALPH BAKER.